US005415264A

United States Patent [19]

Menoud

[11] Patent Number: 5,415,264

[45] Date of Patent: May 16, 1995

[54] AUTOMATIC VENDING MACHINE FOR NEWSPAPERS

[75] Inventor: Edouard Menoud, Plan-les-Ouates, Switzerland

[73] Assignee: Journomat AG, Zurich, Switzerland

[21] Appl. No.: 65,634

[22] Filed: May 21, 1993

[30] Foreign Application Priority Data

May 22, 1992 [CH] Switzerland ....................... 01659/92

[51] Int. Cl.[6] ........................... G06F 9/04; G06F 7/04

[52] U.S. Cl. .................................. 194/217; 235/381; 235/382; 340/825.31; 364/479

[58] Field of Search ............... 194/217, 218, 317, 350; 340/825.31, 825.33, 825.34, 825.35; 364/478, 479; 235/382, 382.5, 380, 381; 221/213, 155

[56] References Cited

U.S. PATENT DOCUMENTS

| | | | |
|---|---|---|---|
| 2,432,415 | 12/1947 | Hatcher et al. | 221/213 X |
| 2,819,817 | 1/1958 | Mackenzie et al. | 221/213 |
| 3,917,114 | 11/1975 | Grosse | 221/213 X |
| 3,948,376 | 4/1976 | Roman | 194/317 |
| 4,288,783 | 9/1981 | Chauvat et al. | 340/825.31 X |
| 4,369,442 | 1/1983 | Werth et al. . | |
| 4,598,378 | 7/1986 | Giacomo | 364/479 |
| 4,598,810 | 7/1986 | Shore et al. | 364/479 X |
| 4,654,513 | 3/1987 | Hennessy . | |
| 4,696,385 | 9/1987 | Davies | 194/328 X |
| 4,767,917 | 8/1988 | Ushikubo | 340/825.35 X |
| 4,845,484 | 7/1989 | Ellsberg . | |
| 4,889,221 | 12/1989 | Schlumpf . | |
| 4,907,250 | 3/1990 | Ricks | 364/479 X |
| 4,908,769 | 3/1990 | Vaughan et al. | 340/825.35 X |
| 4,967,895 | 11/1990 | Speas | 194/317 X |
| 5,136,284 | 8/1992 | Kitamura | 340/825.31 |
| 5,147,021 | 9/1992 | Maruyama et al. | 194/217 |
| 5,293,030 | 3/1994 | Dietrich et al. | 235/381 |

FOREIGN PATENT DOCUMENTS

| | | |
|---|---|---|
| 018718 | 11/1980 | European Pat. Off. . |
| 387972 | 9/1990 | European Pat. Off. . |
| 2359469 | 2/1978 | France . |
| 3113946 | 10/1982 | Germany . |
| 3207148 | 9/1983 | Germany . |
| 3802186 | 5/1989 | Germany . |
| 2211337 | 6/1989 | United Kingdom . |
| 2240649 | 8/1991 | United Kingdom . |

*Primary Examiner*—Michael S. Huppert
*Assistant Examiner*—Scott L. Lowe
*Attorney, Agent, or Firm*—Howard & Howard

[57] ABSTRACT

An automatic vending machine includes a housing having a hinged cover which is releasably locked in a closed position. Coins are inserted in a slot formed in a front wall of the housing and move through a coin checking channel where they are checked by an electronic coin checker. If the correct amount has been deposited, a motor is switched on to move an arm which pushes out a newspaper on the top of a stack in the housing. When a detector senses that the newspaper has been delivered, the coins are deposited in a collection container. When automatic machine is to be restocked and the coins collected, a servicing person inserts a card with a data carrier into the housing and data is read from the card and stored by a computer and a memory. Data concerning the amount collected and the operation of the machine are subsequently transferred to the data carrier of the card and the cover is then unlocked so that the machine can be serviced.

20 Claims, 2 Drawing Sheets

AUTOMATIC VENDING MACHINE FOR NEWSPAPERS

BACKGROUND OF THE INVENTION

The present invention relates generally to an apparatus for automatically vending articles and, in particular, to a machine for vending newspapers.

Automatic vending machines for newspapers and periodicals, or foodstuffs and beverages, or paring meters are frequently equipped with automatic coin collecting devices. These automatic coin collecting devices are located in a housing and collect, for instance, coins which are checked before the article to be vended is released to a customer.

Unfortunately, it has been the experience with such machines that some individuals entrusted with the collection of the coins from the machines are unreliable and it is difficult to determine whether a coin shortage is due to a defective coin checker or an erroneous accounting by the collecting person. For this reason it had been proposed to direct the vending machine coin checking channel into a storage bin, which bin closes automatically when it is removed from the automatic vending machine. For example, see the U.S. Pat. No. 4,889,221. The storage bin is accessible from the outside of the machine by way of a separate cover which can be closed by a key. This solution is expensive. Besides, separate personnel must be employed to collect the coins and to refill of the vending machine.

There is shown in the U.S. Pat. No. 4,845,484 an automatic vending machine for newspapers, in which the newspapers are stacked in a locker shaped stand and offered for sale through a lockable door on the front side the stand. Arranged on the stand is a vending device having a coin checker connected to an audit structure which collects transaction audit data and controls a closure device for the locking and release of the door of the stand. Data collected by the audit structure of this automatic vending machine, such as refilling times, sales figures, times of sales and the amount of money can be read and transmitted by a portable data transmission unit with keyboard and digital display to a central data processing system.

A drawback of the above described newspaper vending machine is that after the release of the door lock, the stack of newspapers is accessible and thereby the possibility of the improper removal of more than one newspaper exists. A further drawback is that either each operator has to carry an unwieldy data transmission unit when refilling the machine, or additional personnel must be used for the collection of the sales data.

The U.S. Pat. No. 4,654,513 shows an automatic vending machine for flat materials such as newspapers. The stack of newspapers is inclined and that position is maintained by a vertical back wall and a telescopically acting rod device. For the delivery of a newspaper, a motor drives gearing which is connected with the rod device, whereby the downward moving rod device releases the uppermost newspaper in the stack, which newspaper under the influence of gravity slides from the stack and drops into a delivery slot. The movement of the motor is controlled by control and memory units which are connected with a magnetic card reader. Data, such as machine codes, subscriber codes, number of deliveries per subscriber and day, as well as specific delivery dates, are transferred to the control and memory units with the aid of a magnetic card which can be read by the card reader.

A drawback of this device is that the delivery of the newspaper is performed solely by gravity. Depending on the composition of the paper and the humidity of the air, the newspaper to be delivered may not slide from the stack which leads to service interruptions and annoyed buyers. A further drawback is that the unidirectional data transfer exchange prevents a versatile application of such an automatic vending machine.

SUMMARY OF THE INVENTION

The present invention concerns an apparatus for automatically vending articles such as newspapers including a housing having an opening for restocking articles to be vended, a cover for closing the opening, an actuatable locking mechanism on the housing for locking the cover in a closed position, an article delivery device in the housing and a control unit in the housing for controlling the locking mechanism and the article delivery device. The control unit includes a programmable computer connected to a memory wherein the memory stores data and an operating program for the computer. A control signal output of the computer is connected to an actuator of the locking mechanism which actuator responds to a control signal generated by the computer for unlocking the cover. A data transfer carrier in the housing accepts a portable information carrier and is connected to the computer. The computer reads first data from a portable information carrier inserted in the data transfer carrier, compares the first data with second data stored in the memory and generates the control signal to the actuator when the first data corresponds to the second data. The computer also reads data stored in the memory to the portable information carrier for use in servicing the vending machine.

The automatic article vending machine also can include a coin checker for receiving and checking coins wherein the coin checker is connected to the computer for generating and storing in the memory coin data signals representing characteristics of the coins. An intermediate cash tray for receiving coins from the coin checker is provided, as well as a coin collection container and a tray actuator coupled to the intermediate cash tray. The tray actuator is connected to the computer and is responsive to another control signal generated by the computer for emptying coins from the intermediate coin tray into the coin collection container. The coin checker includes a coin checking channel and a plurality of coin sensors positioned adjacent to the coin checking channel. The sensors are responsive to coins in the channel for generating the coin data signals. When the computer determines that the proper coins have been inserted, the computer actuates the article delivery device to vend an article. A detector senses the vended article and signals the computer to generate the control signal to empty the intermediate coin tray into the coin collection container.

The present invention solves the prior art problem of proving an automatic article vending machine that can be operated simply and safely.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
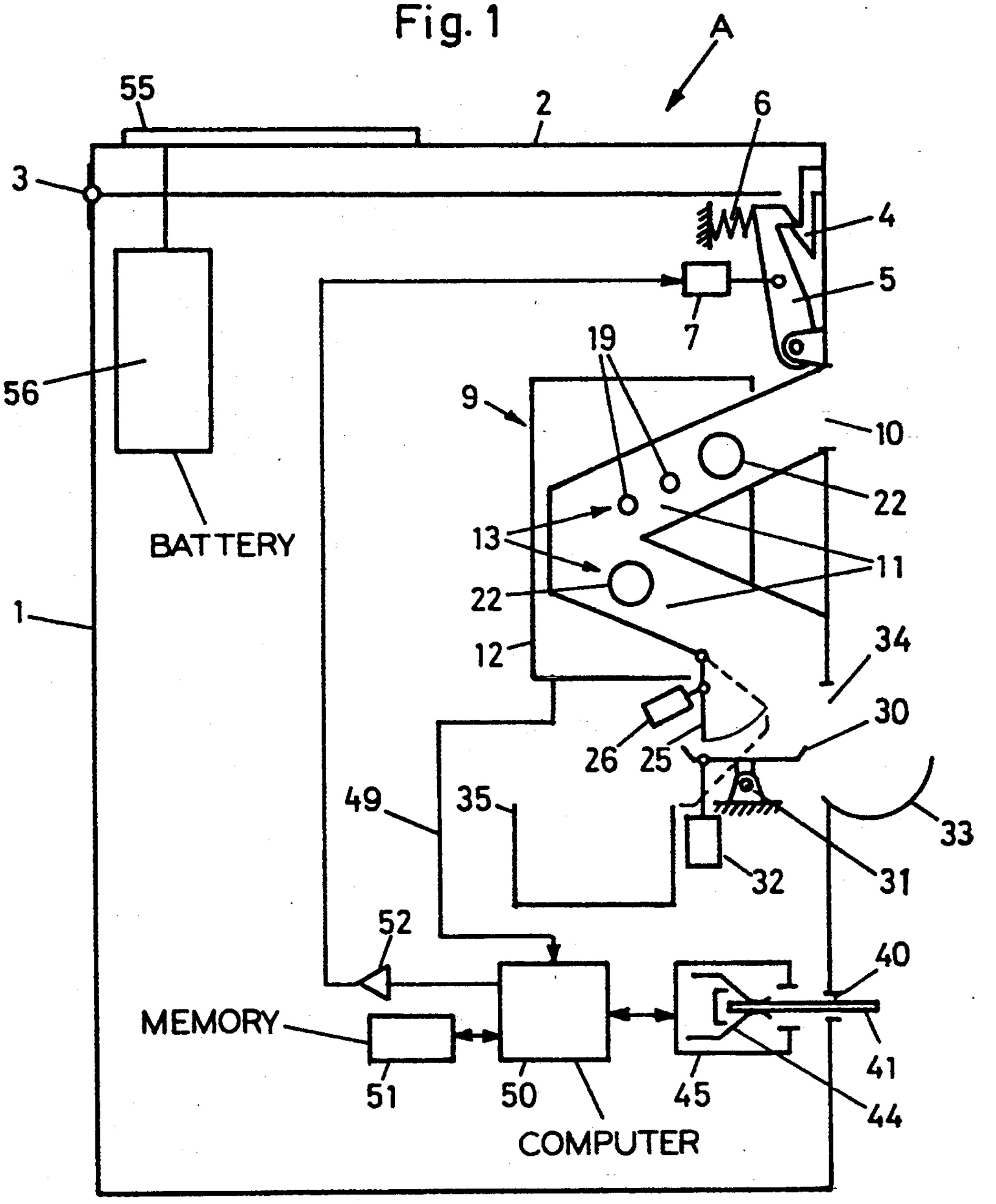
FIG. 1 is a schematic cross-sectional view through a portion of an automatic newspaper vending machine according to the present invention.
Figure 2:
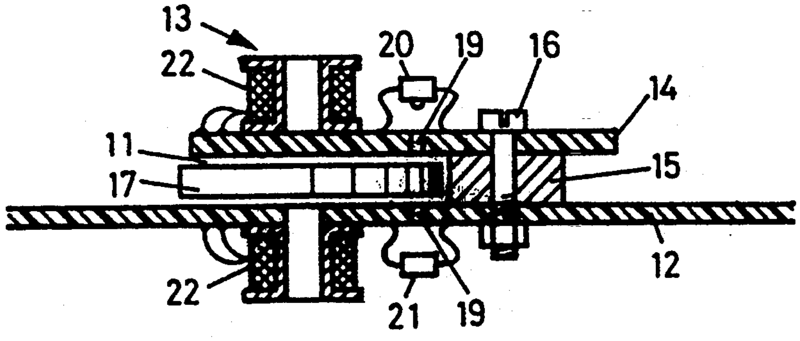
FIG. 2 is an enlarged fragmentary cross-sectional view of a coin checker assembly shown in the FIG. 1.
Figure 4:
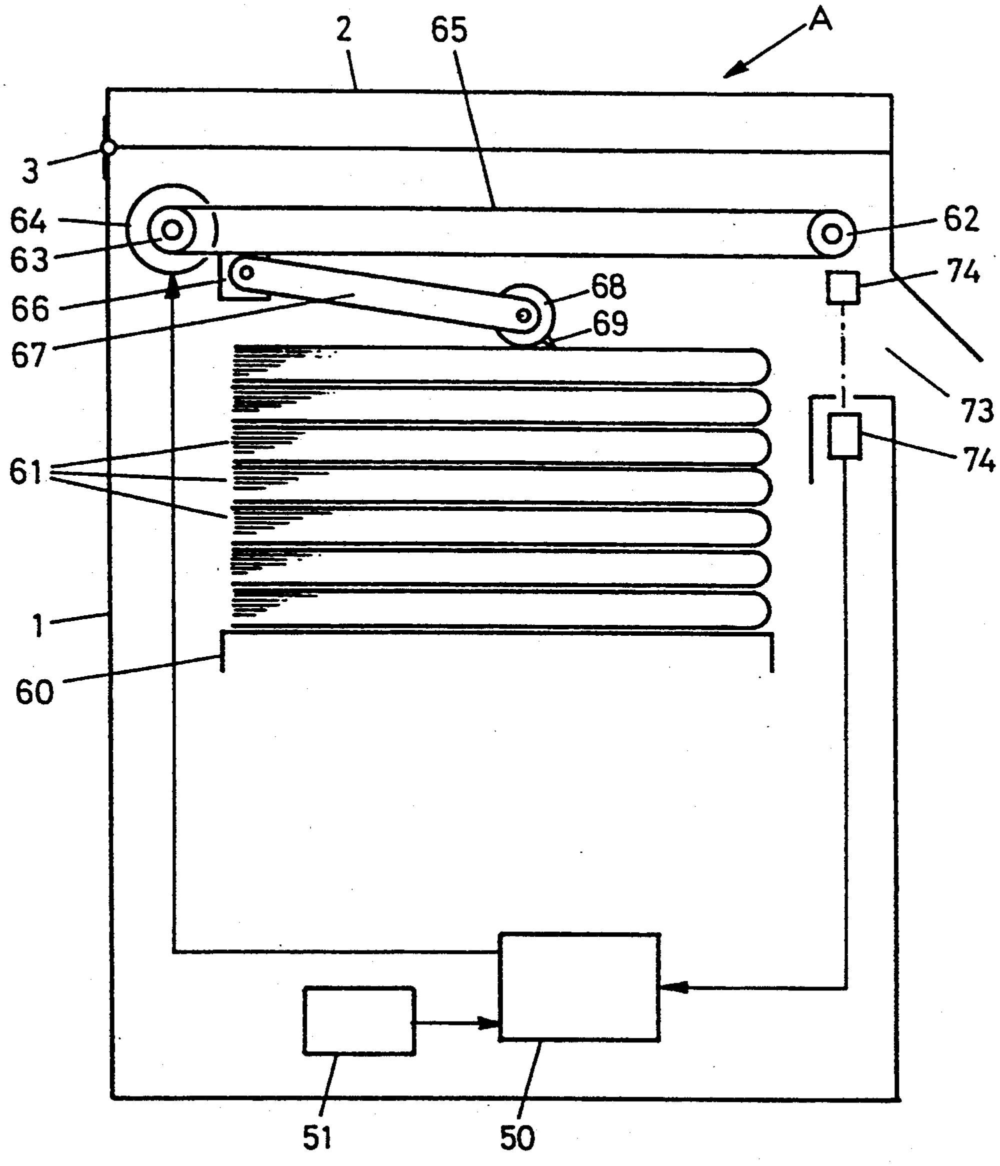
FIG. 4 is a schematic cross-sectional view through another portion of the automatic newspaper vending machine shown in the FIG. 1.

There is shown in the FIGS. 1, 2 and 4 an automatic newspaper vending machine A having a box-like housing 1 with an open top side. A cover 2 has a rear edge attached to a hinge 3 which hinge is also attached to an upper rear edge of the open top of the housing 1. In the generally horizontal position shown in the FIG. 1, the open top side of the housing 1 is securely closed by the cover 2. Mounted on an interior surface of a front edge of the cover 2 is a hook 4 which, in the closed position, engages a catch 5 pivotally attached to an upper interior surface of a front wall of the housing 1. The catch 5 is loaded by a spring 6 mounted in the housing 1 into a locked position to maintain the cover 2 securely closed as shown in the FIG. 1. The catch 5 can be pulled into an unlocked or released position by an electromagnet 7 mounted in the housing 1.

Also mounted in the housing 1 at the front wall thereof is a coin checker assembly 9. A coin slot 10 is formed in the front wall of the housing 1 and is adjacent an upper end of a coin checking channel 11 formed in the assembly 9. The channel 11 is generally shaped like the letter "V" on its side with an upper end being positioned above a lower end at the front wall of the housing 1 and a point of the "V" spaced behind the front wall and extending toward a rear wall of the housing 1. A printed circuit board 12 forms one side wall of the channel 11 and, as shown in the FIG. 2, a parallel wall of the channel 11 is formed by a printed circuit board 14. A plurality of coin sensors 13 are mounted on the exterior surfaces of the boards 12 and 14. A metal rail 15 slightly wider than a thickest coin to be accepted is positioned between the boards 12 and 14 to provide a surface on which a coin 17 can roll on its edge under the influence of gravity. The coin checker 9 is held together by one or more fasteners 16 which extend through the boards 12 and 14 and through the rail 15.

The sensors 13 mounted on the circuit boards 12 and 14 detect various characteristics of the coin to enable the automatic vending machine A to determine whether a genuine coin of a particular denomination has been inserted into the coin slot 10. The sensors 13 include at least two light barriers each formed of a light emitting diode (LED) 20 mounted on the exterior surface of the board 14 and a cooperating photo receptor or photoelectric cell 21 mounted on the exterior surface of the board 12. A very precise, sharply defined position of each of the light barriers is achieved by passing the light generated by the LED 20 through two aligned small apertures 19, one of the apertures 19 being formed in each of the boards 12 and 14, before the light reaches the associated receptor 21. The apertures 19 are spaced predetermined distances from the surface of the rail 15 on which the coin will roll. Thus, the diameter of the coin 17 can thereby be measured accurately.

Furthermore, the sensors 13 include two pairs of opposed electromagnetic elements 22 mounted on the exterior surfaces of the boards 12 and 14 for detecting additional characteristics of the coin 17. Typically, the electromagnetic elements 22 are coils which are excited at a predetermined frequency by oscillators. By selecting the size of the coil, the spacing from the coin 17 as it passes the coil and the frequency of the excitation voltage, the diameter of the coin, the thickness of the coin, relief on the face of the coin and the material composition of the coin can be determined. Thus, the sensors 13 represent any combination of light barriers and electromagnetic elements which will generate data representing an identification of the coin 17.

At the lower end of the coin checking channel 11 there is pivotally mounted a coin directing door 25 which can be set to either of two positions by an electromagnet 26 mounted on the assembly 9. In the position shown in the FIG. 1, the door 25 guides an accepted coin into an intermediate cash tray 30 mounted in the housing 1 below the lower end of the channel 11. In the other position, shown as a dashed line in the FIG. 1, the door 25 guides a rejected coin through an opening 34 in the front wall of the housing 1 and into a return tray 33 mounted on an exterior of the housing 1. The coin can be rejected based upon its size as determined by the receptors 21 or its material composition as determined by the elements 22 in order to reject incorrect denomination and/or fake coins.

The intermediate cash tray 30 is pivotally mounted in the housing 1 and can be tilted in opposite directions from the horizontal position shown about an axis 31 by an electromagnet 32 mounted in the housing 1. If the tray 30 is tilted toward the front wall of the housing 1, a coin rolling out of the lower end of the channel 11 is directed through the opening 34 formed in the front wall of the housing 1 into the return tray 33. If the tray 30 is tilted toward the back wall of the housing 1, a coin rolling out of the lower end of the channel 11 is directed into a coin collecting container 35 mounted in the housing 1.

Figure 3:
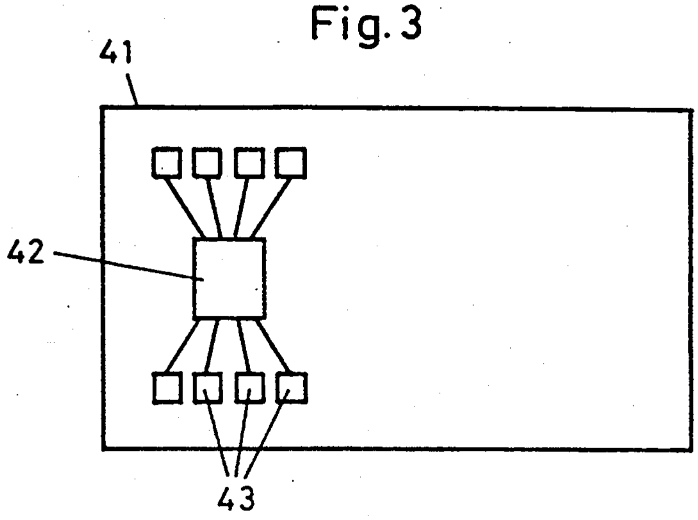
FIG. 3 is a plan view of an operator card shown in the FIG. 1.

A generally horizontally extending slot 40 for the insertion of a portable information carrier such as a card 41 is provided in a lower portion of the front wall of the housing 1 below the return tray 33. As shown in the FIG. 3, the card 41 has a programmable data carrier 42 in the form of an integrated circuit typically attached to both sides thereof. The carrier 42 is connected with a plurality of electrically conducting contact surfaces 43 formed on the surface of the card 41. A pair of contact reeds or blades 44 are mounted in a data transfer carrier 45 which is a part of the circuit board 12. In the inserted position of the card 41 shown in the FIG. 1, the reeds 44 make electrical contact with the surfaces 43. A programmable computer or microprocessor 50 is located in the housing 1 and has one input/output connected to the data transfer carrier 45. A memory 51, which stores a program for operating the automatic newspaper vending machine A and data received from the computer 50, is connected to another input/output of the computer 50. Yet another input to the computer 50 is connected to the circuit boards 12 and 14 by a data input line 49 for receiving coin data generated by the sensors 13.

Under the control of the program in the memory 51, the computer 50 processes the data from the sensors 13 and the card 41, sends data to the memory 51 and the card 41 and generates control signals. For example, a control signal is generated at an output of the computer 50 connected to an input of an amplifier 52. An output of the amplifier 52 is connected to the electromagnet 7 to control the release of the catch 5. Thus, the card 41 can be used to unlock the cover 2 to enable maintenance of the elements inside the housing 1 and to permit restocking of the articles to be vended. Although not shown, other outputs of the computer 50 are connected in a similar manner to the electromagnets 26 and 32 for moving the door 25 and tilting the tray 30 respectively. The power supply for the electrically powered elements of the automatic vending machine A is provided by a plurality of photovoltaic cells 55 mounted on an exterior surface of the cover 2 and connected to a storage battery 56 located in the housing 1.

As shown in the FIG. 4, a plurality of newspapers or periodicals 61 are stacked on a height-adjustable horizontally extending platform 60 located inside the housing 1. The platform 60 can, for example, be guided and adjusted in height in a manner such that the uppermost newspaper 61 of the stack is always located at the same height in the housing 1. Typical prior art mechanisms for supporting newspapers are shown in the Swiss Patent No. 682020 and the U.S. Pat. No. 4,889,221.

A pair of toothed pulleys 62 and 63 are rotatably supported at the front and rear respectively of the interior surface of the cover 2. The pulley 63 is connected to the power take-off shaft of a reversible motor 64 mounted inside the cover 2. An endless toothed belt 65 is stretched over the pulleys 62 and 63 such that rotation of the pulley 63 by the motor 64 will rotate the pulley 62. Attached to a lower portion of the toothed belt 65 adjacent to the pulley 63 is a bracket 66 to which one end of an arm 67 is pivotally attached. Rotatably supported on a free end of the arm 67 is a roller 68 which rests on the upwardly facing surface of the top one of the newspapers 61. The range of the angle of the rotating movement of the arm 67 and the roller 68 is limited to about 60° by not illustrated stops. In the rearward limit position shown, one or more prongs 69 protrudes from the roller 68 in a forward and downward direction. An output of the computer 50 is connected to the motor 64 for switching the motor on and off. When the computer 50 switches on the motor 64, the pulley 63 is rotated in a counterclockwise direction to drive the arm 67 toward the front wall of the housing 1. The forward movement of the arm 67 and the attached roller 68 and the prong 69 frictionally pushes the uppermost newspaper 61 out from a delivery slot 73 formed in the front wall of the housing 1.

The motor 64 is switched on by the computer 50 as soon as the correct amount of coins is present in the intermediate cash tray 30. The motor 64 reverses as soon as the bracket 66 has reached a not illustrated forward limit stop. On the return trip of the bracket 66, the roller 68 rolls initially on the uppermost newspaper 61 so that the prongs 69 are disengaged from the surface of the newspaper and then rolls subsequently onto the next newspaper 61 in the stack until the bracket 66 engages another not illustrated limit stop in the rearward limiting position shown in the FIG. 4.

Mounted inside the housing 1 adjacent to the delivery slot 73 is a sensor 74, shown as light barrier, which is connected to an input of the computer 50. The sensor 74 signals the presence of the pushed-out newspaper 61 to the computer 50. On the reception of this signal, the computer 50 actuates the electromagnet 32 so that the coins drop from the intermediate cash tray 30 into the coin collecting container 35.

Should an interruption occur in the delivery of the newspaper 61, for example if the newspaper 61 is jammed, the motor 64 is reversed for a predetermined time, for example five seconds, to return the bracket 66 and the arm 67 to the original starting rearward limit position. Simultaneously, the electromagnet 32 is controlled by the computer 50 such that the intermediate cash tray 30 is tilted and the coins therein are emptied into the return tray 33. This return of the money can also take place, if for example during a predetermined time period no further coins are inserted into the coin slot 10 to fully pay the purchase price, or if other interruptions make the delivery of the newspaper 61 impossible. Thus, a coin return push button is not required.

The above described automatic newspaper vending machine A is extraordinarily service and user friendly and is well protected against wanton damage, since it does not have any external levers or buttons which have to be operated. It also offers significant advantages for management. The card 41 can be used to collect sales information stored by the computer 50 in the memory 51 and to direct the computer to actuate the electromagnet 7 to unlock the cover 2 thereby permitting restocking of the newspapers 61. Thus, a servicing person receives the card 41 from management together with the articles to be placed in the machine A. The card 41 authorizes the person to open the automatic machine by having stored thereon data concerning one or several automatic machines to be serviced, for example a machine identification number, the identification of the servicing person and the work to be performed, for example the articles to be restocked and their actual price, as well as data about the characteristics of the coins of the currency of the country in which the vending machine is located. The servicing person inserts the card 41 into the slot 40 and the data stored on the card is transferred through the data transfer carrier 45 and the computer 50 and stored in the memory 51. At the same time, the computer 50 transfers at least the data obtained since the last servicing onto the card 41, for example data about the person and time of the last servicing, data and time of the present servicing, number of the articles sold, date and time of the sale, number and type of the coins cashed. Furthermore, it is possible to transfer data concerning the operation of the automatic machine, for example the number and kind of rejected coins, condition of the battery, and collection or delivery disturbances. As soon as the data transfer is complete, the computer 50 compares data from the card with data stored in the memory and unlatches the cover 2 so that the ordered work, for example the refilling of the articles and the collection of the cashed coins can be carried out, if the received and stored data match. Thus, the servicing person obtains from the computer 50 a key for opening the automatic machine A in exchange for data.

The servicing person returns the card 41 to management to account for the cashed coins. For this reason, the same person can be employed for restocking the articles and collecting the coins, which reduces the personnel expenditure considerably. The data stored on the card returned to management is read into a central computer to account for the collected coins and to provide valuable data concerning the planning of the maintenance and restocking of the vending machine. If, for example, one of the automatic vending machines is frequently sold out prior to the time of the next servicing, its servicing cycle can be matched correspondingly.

If an automatic vending machine frequently rejects coins of a certain sort, the coin checker of this machine can be adjusted.

Other advantages of the present invention are that the batteries do not have to be replaced on a regular schedule since they are constantly recharged. Various articles can be sold from the same machine, for example, a different periodical on each day of the week wherein the computer 50 is automatically programmed by the card 41 for the correct price of the offered periodical which price can be indicated on a liquid crystal display (not shown) under the control of the computer.

Thus, the automatic vending machine according to the present invention can be operated considerably more cost efficiently than known vending machines.

Furthermore, the automatic vending machine according to the present invention makes it possible to issue subscriptions to buyers. In case the subscription of newspapers or periodicals has been established by means of a customer debit or credit card similar to the card 41, it is also possible to use the automatic vending machine A without the coin checker 9, intermediate cash tray 30, the coin collecting container 35 and the return tray 33. Of course a buyer card does not open the machine, but brings about on insertion the delivery of the article being vended. The computer 50 reads the subscription information from the card 41 and causes the article to be delivered while at the same time sending data to the card remove or block the subscription authorization for this day. The buyer can receive a newspaper with the card daily at any automatic vending machine according to the invention which contains the subscribed newspaper.

A further possibility is the use of buyer debit card. In this case, the corresponding sale price is removed from authorized amount data stored on the card when an article is delivered. The authorized amount can be replaced or increased in a separate automatic machine. A further possibility is the use of so-called Bingo-cards which make possible the free delivery of a predetermined number of predetermined articles for advertising purposes.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An automatic vending machine having a housing with a lockable cover for access to the interior of the housing by a service person and an article delivery device mounted in the housing for delivering articles to a buyer comprising:

- a programmable computer having first and second input/outputs and a control signal output and being connected to the article delivery device for controlling the delivery of the articles to the buyer;
- a memory connected to said first input/output for storing collected data signals from said computer and an operating program for said computer;
- an actuator for unlocking the cover on the automatic vending machine housing in response to a control signal and being connected to said control signal output;
- a portable information carrier for use by a service person and having first data stored therein for unlocking the cover; and
- a data transfer carrier for receiving said portable information carrier inserted therein by the service person and being connected to said second input/output of said computer, said computer initiating and controlling a data exchange when said portable information carrier is inserted in said data transfer carrier, said computer reading said first data stored in said portable information carrier, said computer sending said collected data signals from said memory to said portable information carrier in response to said first data, and said computer generating said control signal to said actuator when said data exchange of said collected data signals is complete whereby access is provided to the interior of the housing through said cover for the service person.

2. The automatic vending machine according to claim 1 including comparison means in said computer and wherein said computer compares said first data with second data stored in said memory in said comparison means and generates said control signal to said actuator when said first data correspond to said second data.

3. The automatic vending machine according to claim 1 wherein said data transfer carrier includes a plurality of electrically conducting contacts for contact with corresponding ones of a plurality of electrically conducting contact surfaces on the portable information carrier.

4. The automatic vending machine according to claim 1 including a coin checker for receiving and checking coins and being connected to said computer for generating and storing in said memory as said collected data signals coin data signals representing characteristics of the coins including the value of the coins.

5. The automatic vending machine according to claim 4 including an intermediate cash tray for receiving coins from said coin checker, a coin collection container and a tray actuator coupled to said intermediate cash tray and connected to said computer, said tray actuator being responsive to another control signal generated by said computer for emptying coins in said intermediate coin tray into said coin collection container.

6. The automatic vending machine according to claim 4 wherein said coin checker includes a coin checking channel and a plurality of coin sensors positioned adjacent to said coin checking channel and being responsive to coins in said channel for generating said coin data signals, said computer being connected to said coin sensors for receiving said coin data signals.

7. The automatic vending machine according to claim 6 wherein said coin sensors include at least one electromagnetic element for detecting a characteristic of a coin in said coin checking channel.

8. The automatic vending machine according to claim 6 wherein said coin sensors include at least one light barrier for detecting a characteristic of a coin in said coin checking channel.

9. The automatic vending machine according to claim 1 including an electric motor connected to said computer and coupled to the article delivery device, said computer actuating said electric motor to cause the article delivery device to vend an article from the housing.

10. The automatic vending machine according to claim 9 including a coin checker for receiving and checking coins and being connected to said computer for generating and storing in said memory as said collected data signals coin data signals representing characteristics of the coins, an intermediate cash tray for receiving coins from said coin checker, a coin collection container, a tray actuator coupled to said intermediate cash tray and connected to said computer, said tray actuator being responsive to another control signal generated by said computer for emptying coins in said intermediate coin tray into said coin collection container and a detector connected to said computer for generating a detector signal in response to the article delivery device vending an article, said computer generating said another control signal in response to said detector signal and said collected data signals including information identifying the value of the coins in said coin collection container.

11. The automatic vending machine according to claim 1 including a power supply having at least one photovoltaic cell connected to a storage battery, said power supply being connected to said computer and to said actuator.

12. The automatic vending machine according to claim 1 wherein the article delivery device is connected to said computer, said computer actuating the article delivery device to vend an article from the housing in response to data read from another portable information carrier inserted in said data transfer carrier by the buyer.

13. An automatic vending machine comprising:

a housing having a lockable cover for access to an interior of said housing by a service person;

a coin slot formed in an exterior wall of said housing for accepting coins;

a coin checker mounted in said housing for receiving coins from said coin slot, for checking the coins for characteristics, and for generating coin data signals representing the characteristics of the coins;

an article delivery device for delivering articles in the housing to a buyer;

a control unit connected to said coin checker for receiving and storing said coin data signals, said control unit being connected to said article delivery device for delivering an article to the buyer in response to insertion of a predetermined amount of money in the form of coins into said coin slot;

a data transfer carrier connected to said control unit for receiving a portable information carrier inserted therein by the service person;

an actuator connected to said control unit and coupled to said lockable cover for unlocking said lockable cover in response a control signal generated by said control unit, said control unit generating said control signal in response to predetermined first data read by said control unit from said portable information carrier inserted in said data transfer carrier by the service person; and a power supply connected to said coin checker, said article delivery device, said control unit and said actuator.

14. The automatic vending machine according to claim 13 wherein said coin checker includes a coin checking channel formed therein connected at one end to said coin slot and a plurality of coin sensors adjacent said coin checking channel and responsive to coins in said coin checking channel for generating said coin data signals.

15. The automatic vending machine according to claim 14 including an intermediate cash tray pivotally mounted in said housing adjacent a coin outlet end of said coin checking channel for temporarily storing coins inserted into said coin slot.

16. The automatic vending machine according to claim 15 including a cash tray actuator coupled to said intermediate cash tray for tilting said intermediate cash tray, said cash tray actuator being connected to said control unit, and a coin collection container in said housing adjacent to said intermediate cash tray whereby said control unit actuates said cash tray actuator to tilt said intermediate cash tray and empty any coins in said intermediate cash tray into said coin collection container.

17. The automatic vending machine according to claim 15 including a coin director door pivotally mounted in said housing adjacent said coin outlet end of said coin checking channel, a door actuator coupled to said coin director door and connected to said control unit, a return tray external to said housing and adjacent an opening in said housing, said opening being adjacent to said coin outlet end of said coin checking channel whereby said coin director door normally directs coins into said intermediate cash tray and said control unit actuates said door actuator to pivot said coin director door and direct coins through said opening into said return tray.

18. The automatic vending machine according to claim 13 wherein said control unit includes a memory for storing collected data signals and an operating program and a computer connected to said memory for reading said operating program and for storing said coin data signals as said collected data signals in said memory.

19. In an automatic vending machine for articles having an article retaining housing with an opening for restocking the articles and for maintenance, a cover attached to the housing for closing the opening, an actuatable lock for the cover, a coin slot formed in an exterior wall of the housing for accepting coins, a coin checker for receiving coins from the coin slot and for checking the coins and an article delivery device for delivering an article to be vended from the housing, the improvement comprising:

an actuator coupled to the actuatable lock for the cover;

a programmable computer connected to said actuator, the coin checker and the article delivery device;

a memory connected to said computer for storing collected data signals and an operating program for the computer;

a coin collecting container for receiving coins from the coin checker, the coin checker generating coin data signals to said computer including information identifying coins in said coin collecting container; and a data transfer carrier for receiving a service card from a service person and being connected to said computer, said computer reading first data from the service card and being responsive to said operating program and to said first data for generating a control signal to said actuator to unlock the cover for restocking articles and for maintenance by the service person and being responsive to said operating program and to said coin data signals for actuating the article delivery device to deliver an article to a buyer.

20. The automatic vending machine according to claim 19 wherein said computer is responsive to second data read by said computer from a customer portable card received by said data transfer carrier from the buyer for actuating said article delivery device to deliver an article to the buyer.

* * * * *